March 28, 1944.   J. E. NAUTA   2,345,063
MIXING APPARATUS, ESPECIALLY ADAPTED FOR MIXING PULVERIZED MATERIALS
Filed Oct. 31, 1940   2 Sheets-Sheet 2
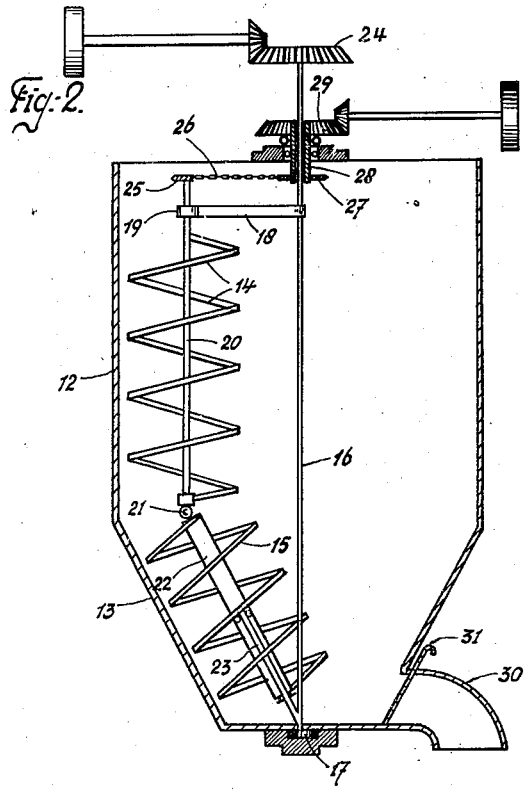
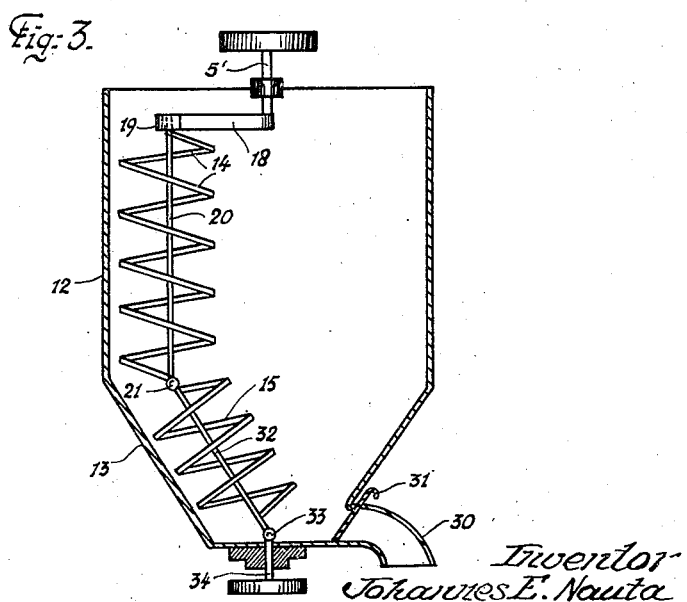
Inventor
Johannes E. Nauta Patented Mar. 28, 1944

2,345,063

UNITED STATES PATENT OFFICE 2,345,063

MIXING APPARATUS, ESPECIALLY ADAPTED FOR MIXING PULVERIZED MATERIALS

Johannes Ewardus Nauta, Overveen, Netherlands; vested in the Alien Property Custodian Application October 31, 1940, Serial No. 363,778
In the Netherlands November 13, 1939

6 Claims. (Cl. 259—40)

This invention relates to a mixing apparatus which is particularly adapted for mixing pulverized materials, such as flour, and which comprises a stationary mixing trough having an outlet opening for the mixed product at its lower end and being provided with a mixing screw which is driven in such a manner that the contents of the trough are conveyed from the lower end to the upper end thereof and then fall back again in the mixing trough.

In the known mixers of the above mentioned kind the mixing or converging screw is centrally mounted in the mixing trough. This presents the disadvantage that in most cases the product leaving the mixing trough is incompletely mixed. Especially when the product is somewhat moistened or contains a certain percentage of syrup or molasses, it partially adheres to the side walls of the mixing trough, so that the trough cannot be wholly emptied out and the finished product will be of non-homogeneous composition. This is also the case with flour having added thereto some heavy mineral substances. These heavy substances are forced outwardly by the rotating screw and then stick to the side walls of the trough, thus being prevented to be thoroughly mixed in the product.

One of the primary objects of the invention is to obviate the above mentioned drawbacks of the known mixers and to achieve a mixing device which is very simple of construction and effective in use and which enables a thorough mixing so as to obtain a finished product of great homogeneity with practically no losses.

A further object of this invention is to obtain the above mentioned results in mixing troughs of conical shape over the whole of their length, as well as in troughs of greater capacity being substantially of cylindrical form and only conical at their lower part. A still further object is to provide for an arrangement which enables to introduce syrup, molasses and other liquid or plastical ingredients into the trough and to distribute these ingredients uniformly over the contents of the trough during the mixing operation.

With these and other objects in view, there have been illustrated on the accompanying diagrammatic drawings some preferred embodiments of the invention.

Fig. 2 shows an embodiment of the invention in which the mixing trough is substantially cylindrical and only conical at its lower part.

Fig. 3 shows another embodiment having a trough of the same shape as in Fig. 2.

Figure 1:
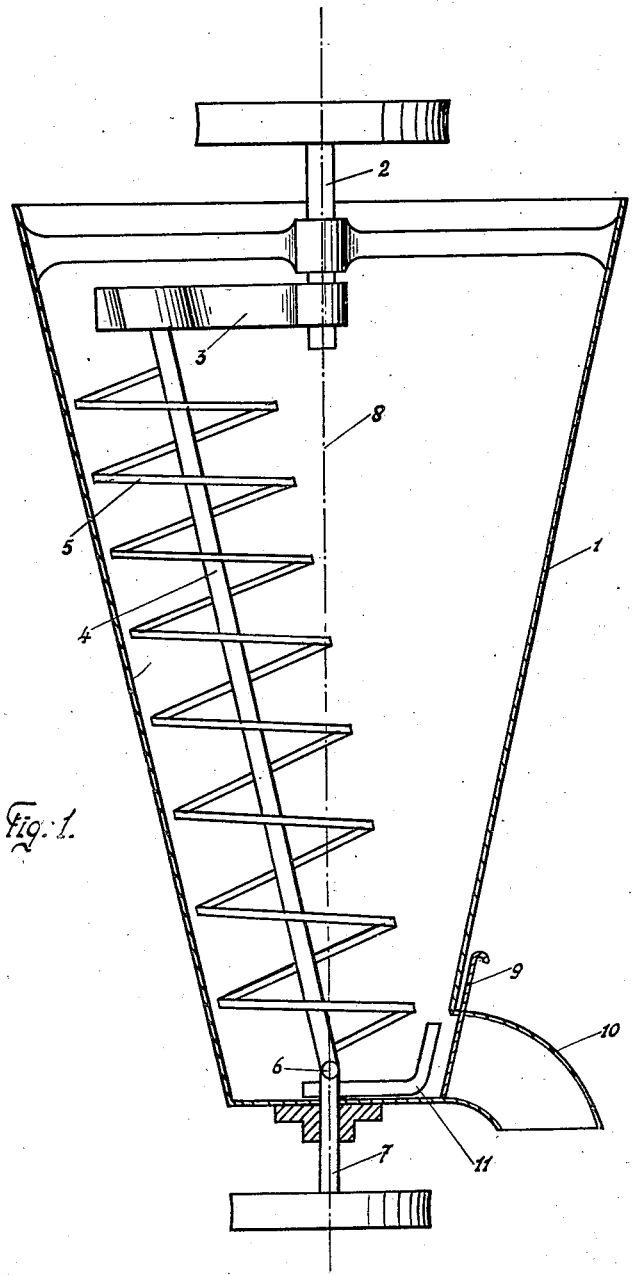
Fig. 1 is a vertical sectional elevation of a mixing apparatus according to the invention comprising a mixing trough of conical shape.

Referring to Fig. 1 the mixing trough is of conical shape over the whole of its length. On the upper side of the trough 1 and coaxially with the vertical axis thereof a driving shaft 2 is mounted which is rigidly fixed to a crank arm 3. In the outer extremity of said crank arm 3 the shaft 4 of the helical mixing screw 5 is rotatably mounted. The screw 5 takes an inclined position within the trough and is practically parallel to the conical side walls of the trough. By means of a ball and socket joint or a universally jointed coupling 6 of known construction, which may also be replaced by an appropriate flexible coupling, the lower extremity of the screw shaft 4 is connected to a centrally disposed driving shaft 7 which passes through the bottom of the mixing trough.

When the shaft 7 is driven, the screw shaft 4 rotates about its own axis. When the shaft 2 is driven at the same time (this is done, however, with a number of revolutions which is smaller than that of the shaft 7), the screw shaft 4 also revolves about the central axis 8 of the mixing trough, causing the screw 5 to move slowly along the side walls 1. Due to the fact that the mixing screw 5 is situated near the side walls of the trough and moves along these walls, a thorough mixing of the contents of the trough will be assured and it will be no longer possible that portions of the contents stick to the walls. Apart from a better mixing effect, the mixing operation is also effected more rapidly than in ordinary mixers of this kind, so that the output of the apparatus will be considerably increased.

The revolution of the mixing screw about the axis 8 may be obtained in any other convenient manner. For instance the screw shaft 4 may be provided at its upper end with a pinion engaging either a circular toothed rack fixed upon the inner walls of the trough, or a stationary toothed wheel of large diameter mounted centrically in the trough. In this case the crank arm 3 and driving shaft 2 may be left out, since if the shaft 4 is driven about its own axis by means of the driving shaft 7, the pinion at the upper end of the shaft 4 will move along the rack or stationary toothed wheel, thus causing a slow revolving movement of the screw 5 about the central axis 8.

The mixing trough is provided at its lower end with an outlet 10 which may be shut by means of a slide 9 or the like. The shaft 7 may be provided in a known manner with a stirring blade 11.

The materials to be mixed are of pulverized or powdery nature. When a certain percentage of syrup, oil, water, molasses or other moist ingredients is added, the mass in the trough becomes somewhat crumbling, but it does not take a doughy or pastelike form.

Now referring to Fig. 2 of the drawings, the side walls of the mixing trough comprise a cylindrical upper part 12 and a conical lower part 13; thus the capacity of the trough will be larger than that of the trough according to Fig. 1. In order to obtain the same advantages as in the above described embodiment, the mixing screw consists of two parts, of which the upper part 14 is parallel to the cylindrical wall 12, whereas the lower part 15 lies parallel to the conical wall 13. Centrally disposed in the mixing trough is a vertical driving shaft 16 which is rotatably mounted with its lower end in a step bearing 17. Rigidly connected to this shaft 16 is a crank arm 18 having at its outer extremity a bearing 19 in which the shaft 20 of the upper screw part 14 is rotatably mounted. The said shaft 20 is connected by means of a ball and socket joint 21 or a such like jointed or flexible coupling to a bush 22 carrying the lower screw part 15. By means of ball bearings the bush 22 is rotatably mounted on a shaft 23 rigidly connected to the lower end of the driving shaft 16. The driving shaft 16 carries at its upper extremity a bevel gear 24 which is driven with a relatively small number of revolutions. When driving the shaft 16 a revolving movement is imparted to the screw parts 14 and 15 along the side walls 12 and 13 of the trough.

In order to rotate the screws 14 and 15 about their own axes, the shaft 20 is provided at its upper end with a sprocket wheel 25 connected by means of a chain 26 to a sprocket wheel 27 mounted on the lower part of a bush 28 surrounding the shaft 16 and carrying at its other end a bevel gear 29 which is driven with a greater number of revolutions than the gear 24.

The mixing trough is provided at its lower end with an outlet 30 which may be controlled by a slide 31.

The shaft portion 23, as well as the bush 22, may be omitted, when the shaft 20 is connected by means of the coupling 21 to a shaft for the lower screw part, which shaft is then rotatably mounted with its lower end in a bearing rigidly connected to the driving shaft 16.

The materials to be mixed may be supplied either on the upper or on the lower side of the mixing trough. In the latter case the supply may, e. g., be effected by means of a centrally disposed conveying screw joining the lower end of the screw part 15.

In the modification according to Fig. 3 the central driving shaft 5' is made of short length and it only reaches to the crank arm 18 which again carries in the bearing 19 the upper screw shaft 20. This screw shaft 20 is now connected by means of the coupling 21 to a lower screw shaft 32 carrying the screw part 15. By means of a second ball and socket joint or similar coupling 33 the shaft 32 is connected to a central driving shaft 34 at the lower end of the mixing trough. This shaft 34 causes the rotation of the screw parts 14 and 15 about their own axes.

In all embodiments the screw shaft or screw shafts may be made hollow and provided with nozzles, pipes or the like communicating with the interior of the shaft or shafts. The nozzles, which may be fixed upon or below the blades of the mixing screw or screws, have their outlet openings arranged in such a manner that, when the mixer is in operation, the openings lie behind in the direction of revolution of the screw, so as to prevent their obstruction by the materials to be mixed. The hollow shafts may be supplied under pressure with syrup, molasses, oil or other liquid ingredients, so that it is possible to add such ingredients to the dry materials during the mixing operation. Since the nozzles revolve with the screw or screws along the side walls of the mixing trough, the ingredients will be uniformly distributed over the contents of the trough.

In known mixers the ingredients, as well as the pulverized products are brought together in a continuous stream before reaching the mixing trough. If by any reason the proportion of ingredients and pulverized materials is not correctly adjusted, the finished product will be necessarily of incorrect composition. According to the invention, however, the pulverized materials and the ingredients may be brought together in the mixing trough and it does not matter when the velocity of the supplying stream of the pulverized materials and that of the stream of ingredients are not correctly and precisely adjusted to each other. Due to the uniform distribution of the ingredients through the contents of the mixer, it is only necessary to supply a definite quantity of such ingredients at each filling of the mixing trough.

Instead of one mixing screw as in Fig. 1 or one set of screw parts as in Figs. 2 and 3, there may be provided two screws or two sets of screw parts diametrically arranged to each other, or even there may be a plurality of such screws or screw parts at equal distances from each other along the circumference of the mixing trough. It will be evident that in these cases the time necessary for thoroughly mixing the contents of the trough will be considerably reduced.

What I claim is:

1. In an apparatus for mixing and discharging pulverized and substantially dry materials, such as flour, a stationary mixing receptacle formed with an outlet at the lower end, a shaft extending longitudinally of the receptacle, the lower end of the shaft being supported for rotation in the axial line of the receptacle, the upper end of the shaft being supported for rotation at a point wholly outside the axial line of the receptacle, a helicoid conveyor blade fixed on the shaft and arranged to convey the pulverized material upwardly in the receptacle in the rotation of the shaft, driving means to rotate the shaft on its own axis, and an independent means to revolve the shaft on the axis of the receptacle.

2. A construction as defined in claim 1 wherein the shaft is rotated on its own axis at a speed in excess of the revolution of the shaft about the axis of the receptacle.

3. A construction as defined in claim 1 wherein the driving means for the lower end of the shaft includes a driving element disposed in the axial line of the receptacle and having swivel connection with the lower end of the shaft, and wherein the driving means at the upper end of the shaft includes a driving element arranged in the axial line of the receptacle, an arm carried by the driving element within the receptacle, and means for rotatably supporting the upper end of the shaft at the free end of the arm.

4. In an apparatus for mixing and discharging pulverized and substantially dry materials, such as flour, a stationary mixing receptacle formed with a discharge outlet at the lower end, a shaft extending longitudinally of the receptacle and parallel to the side walls thereof, the lower end of the shaft being supported for rotation in the axial line of the receptacle, the shaft beyond such lower end being without the axial line of the receptacle, a helicoid conveyor blade extending throughout the shaft and arranged to convey the pulverized material upwardly in the receptacle in the rotation of the shaft, means to rotate the shaft on its own axis, and independent means to revolve the shaft on the axis of the receptacle.

5. An apparatus as defined in claim 4, wherein the receptacle is of truncated cone form having its largest diameter at the upper end, the shaft carrying the conveyor blade being parallel to the walls of the cone.

6. An apparatus as defined in claim 4, wherein the receptacle in the lower part is of truncated cone form having its largest diameter at the upper end and in the upper part of cylindrical form having the same diameter as the upper end of the truncated cone, the shaft carrying the conveyor blade consisting of two parts having swivel connection with each other and of which the upper part is parallel to the walls of the cylinder and the lower part is parallel to the walls of the cone.

JOHANNES EWARDUS NAUTA.

CERTIFICATE OF CORRECTION.

Patent No. 2,345,063.   March 28, 1944.

JOHANNES EWARDUS NAUTA.

It is hereby certified that error appears in the printed specification of the above numbered patent requiring correction as follows: Page 1, first column, line 12, for "converging" read --conveying--; and that the said Letters Patent should be read with this correction therein that the same may conform to the record of the case in the Patent Office.

Signed and sealed this 23rd day of May, A. D. 1944.

(Seal)

Leslie Frazer
Acting Commissioner of Patents.